United States Patent [19]
Guide et al.

[11] Patent Number: 4,479,355
[45] Date of Patent: Oct. 30, 1984

[54] POWER PLANT INTEGRATING COAL-FIRED STEAM BOILER WITH AIR TURBINE

[75] Inventors: John J. Guide, Wayne; Joseph E. Carey, Jr., Flanders; Paul D. Eichamer, Ironia; George Claypole, Sparta; George V. Yenetchi, Randolph, all of N.J.

[73] Assignee: Exxon Research & Engineering Co., Florham Park, N.J.

[21] Appl. No.: 468,133

[22] Filed: Feb. 25, 1983

[51] Int. Cl.³ ............................................. F01K 23/02
[52] U.S. Cl. ...................................... 60/683; 60/655; 60/659
[58] Field of Search ................. 60/679, 653, 655, 659, 60/674, 676, 672, 683; 122/1 A, 1 B, 1 R

[56] References Cited

U.S. PATENT DOCUMENTS 2,653,447  9/1953  Heller ..................................... 60/655
3,127,744  4/1964  Nettel ..................................... 60/655

FOREIGN PATENT DOCUMENTS 563847   8/1944   United Kingdom .
681254  10/1952   United Kingdom ................. 60/655
2027739A  2/1980  United Kingdom .
2066284A  7/1981  United Kingdom .

OTHER PUBLICATIONS

"Power" Magazine, Apr. 1982, pp. 128-132 and 350-354.
"Cogeneration of Steam and Electric Power", edited by Robert Noyes, published by Noyes Data Corp., Park Ridge, NJ, U.S.A., 1978, pp. 13-15, 186.
"Analysis of Engineering Cycles", R. W. Haywood, Third Edition, 1980, pp. 5-8.

Primary Examiner—Stephen F. Husar
Attorney, Agent, or Firm—Rebecca Yablonsky

[57] ABSTRACT

A power plant is disclosed in which a steam turbine/coal-fired steam boiler is integrated with an air turbine via using the convection section of the boiler to heat compressed air for the turbine, by indirect heat exchange with the flue gas, the hot turbine exhaust being sent to the boiler as preheated combustion air. In this way, only clean air reaches the turbine and not combustion products which would result from direct firing of fuel in compressed air, whereby coal may be burned instead of premium quality fuels. Platens in the radiant section of the boiler are used both to regulate flue gas temperature and take over some of the usual convection section services to release it for compressed air heating service.

26 Claims, 4 Drawing Figures

POWER PLANT INTEGRATING COAL-FIRED STEAM BOILER WITH AIR TURBINE

FIELD OF THE INVENTION

This invention relates to a power plant which integrates a coal-fired steam boiler with an air turbine and to such a plant with a combined power cycle, viz with both a steam turbine and an air turbine. This air turbine may be characterized as an external combustion-open cycle turbine.

In particular, the invention relates to increasing the cycle efficiency of a condensing power cycle or increasing the power production of a back pressure cycle at comparable efficiency, hence to a system for providing cheaper power.

BACKGROUND OF THE INVENTION

The present system may be described as a pulverized coal boiler with an open cycle air turbine.

An air turbine may be defined as one in which clean air reaches the turbine as distinguished from a gas turbine in which combustion gases are introduced.

Studies have been made of fuel options for the near-term in the United States and it has been concluded that coal is the preferred energy source, particularly for electricity generation, see "Power" magazine, April 1982, pp. 128-132 and 350-354. That is because it is the most abundant energy resource, can be mined successfully and economically, thus is plentiful and low cost. An object of this invention is to use natural coal thereby avoiding expensive conversions of coal to synthetic liquid or gaseous fuels.

Conventionally, coal-fired steam boilers have been used with a steam turbine to generate electricity in power plants. However, the energy added for power generation is not all available for power because the heat of condensation of steam and the sensible heat of the condensed water are not useable for that purpose and constitute waste heat lost to the atmosphere except to the extent utilized for process steam, see "Cogeneration of Steam and Electric Power" edited by Robert Noyes, published by Noyes Data Corporation, Park Ridge, N.J., U.S.A., 1978, pp. 13-15. Consequently, the use of gas turbines—which do not have this drawback since steam is not being condensed—has come under consideration.

However, gas turbines themselves have certain limitations. In their operation, air is compressed, fuel is burned in the compressed air, and the combustion product gases are passed through the turbine. For that reason a premium quality fuel, which is either natural gas or a light petroleum distillate, must be used. If a fuel that is not clean-burning were used, the products of combustion, if passed through the turbine, would rapidly foul or damage the turbine passages and blades. Because of the fouling problem, the use of coal—which can evolve corrosive products and particulate matter—in open-circuit gas turbines has not reached a successful stage of development, although oil and gas find ready use, see "Analysis of Engineering Cycles", R. W. Haywood, Third Edition, 1980, pp. 5-8. Since the reserves of these fossil fuels are limited, practical commercial means of using coal in lieu thereof is highly desirable.

It has been suggested that since one of the major barriers to the widespread applications of gas turbines is that they require premium fuels, they are unlikely to gain wide market acceptance until they are able to burn gaseous or liquid fuels derived from coal (presumably clean fuels) see Noyes, ibid, p. 186. However, gas or liquid fuels derived from coal are not commercially available as yet and additionally this envisages a coal-derived fuel, so that work has to be done on the coal, thereby increasing the cost.

The present invention, going in a completely opposite direction, provides means whereby, in a practical and efficient manner, natural coal can be burned in a steam boiler as the energy source for an air turbine, and is therefore unobvious.

Some efforts have been made to employ combined cycles while using coal as energy source, viz., to heat the air for an air turbine by indirect heat exchange in order to solve the problem of corrosion of the turbine blades caused by direct contact with combustion product gases but these designs have not been attractive enough to receive market acceptance. In U.S. Pat. No. 3,127,744 to Nettel, the means for effecting such heat exchange is a pebble heater. Flue gas from a coal-fired steam boiler is further heated in a secondary furnace to raise its temperature. The flue gas is then passed into contact with pebbles, raising their temperature. Compressed air is then passed into contact with the hot pebbles and is then passed to the inlet of an air turbine. Pebble heaters are seldom used because of their cumbersome mechanical features which can lead to breakdowns, viz., the pebbles flow downwardly by gravity and at the bottom are hoisted up to the top by elevator means; and operation is cyclic in that half of the pebbles are being heated while the other half is releasing heat so that at any given time only half of the inventory is in use. Furthermore, the pebbles, at elevated temperatures, may produce corrosive products which can get into the air contacted by them and thus cause fouling of the turbine. It may be noted that Nettel uses an air heater which is outside the steam boiler.

U.K. Patent Application No. 2,027,739 discloses a process heater for hydrocarbon conversion. It is described as applied to the thermal cracking of hydrocarbons to produce ethylene, hence is a steam cracking furnace. The process heater is employed in conjunction with a gas turbine and the work obtained from the expansion zone is used for compression or refrigeration purposes in the plant. Following compression, the air is heated successively in a gas turbine recuperator, a furnace/turbine heat exchanger which transfers heat from flue gases in the bottom portion of the furnace stack to the air, and one or more conventional combustors. In such a combustor a premium fuel is burned in the air since the combustion products are passed into the turbine. The stack flue gas performs other duties essential to the hydrocarbon conversion process including preheating of the hydrocarbon feed, e.g., naphtha, and superheating of dilution steam for the steam cracking reaction. Under these circumstances not enough heat is available in the stack—because of other process heat requirements—to furnish enough heat to the compressed air to raise it to the high temperature levels achieved in the present invention. It should be noted that cycle efficiency increases with increase in temperature of the air at the inlet to the turbine, as shown in Table V in the following description. Consequently supplementary heating in a combustor is necessary for optimization of the process of this patent. The design therefore does not avoid the requirement to use a premium fuel for raising the temperature of the air. It will be noted that the patentee designates the turbine as a gas turbine. It will also be noted that coal is not used anywhere in the process since the pyrolysis furnace runs on fuel oil. Consequently there is no gain because all stages of heating the compressed air utilize a petroleum fraction as the fuel. In brief, U.K. No. 2,027,739 discloses an oil-fired process heater in conjunction with a gas turbine as distinguished from the present invention in which a coal-fired steam boiler is coupled with an air turbine.

An early patent, U.K. No. 563,847 accepted on Aug. 31, 1944, suggests that a power plant can comprise a steam turbine and an air turbine where the compressed air is heated in the coal-fired steam boiler. However, it does not disclose how the heat duties should be arranged to provide for the requirements of the air heater, since the radiant section continues its normal function of generating steam with the convection section doing all the superheating of the steam. Therefore, there is no teaching of how such a power plant could be designed or operated.

In U.K. Patent Application No. 2,066,284A a process of coal liquefaction is disclosed in which a coal slurry/hydrogen mixture is preheated to a moderate temperature in the range of about 750° to 900° by passing it through the convection section of a boiler. The combustion zone of the boiler burns a bottoms product of the coal liquefaction process itself. The unit furnishes process steam and surplus steam may be used to generate electricity. The application does not in particular describe the structure of the boiler. There is no disclosure of an air turbine. No suggestion is given of any means for operating a turbine which expands a gas so as to avoid the use of premium fuel and operate as an air turbine.

SUMMARY OF THE INVENTION

Air is compressed in the air turbine air compressor, then heated in the convection section of a coal-fired boiler. The hot, compressed air is expanded in the air turbine to drive the air compressor, to generate power, and to exhaust into the coal boiler as preheated combustion air. The boiler generates steam as well as heats the compressed air. This steam is generally expanded in a steam turbine for power generation or to provide power and extraction steam. Thus, the required heat input for the air turbine is done indirectly in the convection section of the coal boiler.

The duties or services of both sections of the boiler are drastically restructured to make heat available for heating the compressed air—which is not a requirement in a conventional steam/power cycle—since in effect there is now an air power plant in addition to a steam power plant. The exact redistribution of duties will be selected in accordance with the type of coal used, as discussed in the following description. In general, the traditional convection section duties are reduced, to permit heating therein of the air for the turbine.

According to the invention, a power plant comprises the combination of: a steam turbine, a coal-fired steam boiler having a radiant section including a combustion zone and steam generating tubes and a convection section provided with tubes for heating compressed air by indirect heat exchange with flue gas; compressor means wherein air is compressed for passage to said convection section; air turbine means driven by expansion of air compressed by said compressor means then heated in said convection section and passed to the inlet of said turbine means, said compressor means being driven by said turbine means or by auxiliary means such as another turbine, an electric motor or similar means; said turbine means being arranged to produce useful power; conduit means for passing air turbine exhaust to said combustion zone as preheated combustion air; and conduit means for removing steam from said boiler and passing the same to the inlet of the steam turbine; said radiant section containing means for steam superheating or for steam superheating plus steam reheating viz., platens comprising a steam superheating section or a steam superheating section plus a steam reheating section and absorbing a sufficient percentage of heat for said services to release the convection section partially from said services and permit the latter to perform air heating duty. By shifting the high temperature services partially from the convection section to the radiant section, high temperature flue gas in the convection section is made available for heating the compressed air whereby the temperature of said compressed air is raised to at least about 1450° F. Eliminating a Ljungstrom air preheater for providing preheated combustion air makes an increment of heat available in the convection section but this only frees relatively low temperature heat, in contrast to the shift of some high temperature job away from the convection section to the platens which frees high temperature heat in the convection section for heating the compressed air.

The power produced can be made available as shaft work, i.e., mechanical work, or, by using a generator, as electricity, either for industrial application or for utility application.

Suitably the air turbine contributes about 5 to 50% of the total net power produced.

BRIEF DESCRIPTION OF THE DRAWINGS

Like parts are designated by like numerals.

DETAILED DESCRIPTION OF THE INVENTION

In the present invention, air is compressed in the air turbine air compressor, then heated in the convection section of a coal-fired boiler by indirect heat exchange with flue gas in a sufficiently high temperature zone thereof so as to raise the temperature of the compressed air to at least about 1450° F., preferably in the range of about 1450° F. to 1700° F., or higher as conditions may permit. The hot compressed air is expanded in the air turbine to drive the air compressor, to generate power, and to exhaust into the coal boiler as combustion air at about 700° to 900° F. A portion of the exhaust may be used to dry the pulverized coal fuel. In the steam production system, radiant heat from the pulverized coal firing, along with convective heat from the flue gas—over and above that required for the air turbine needs—are transferred to tubes in the boiler to produce high pressure, superheated steam. This steam is expanded in a steam turbine for shaft work or electric power generation or to provide shaft work or electric power, and extraction steam.

The radiant section includes an integral metal wall structure containing tubes in which water and/or steam flow, encompassing the combustion zone. The conversion of liquid water to steam is a change of phase that occurs at a substantially constant temperature, the heat of vaporization being supplied from the combustion of the fuel. The change of phase of the water keeps the water walls at the boiling point of water at the existing pressure. The relatively uniform water wall metal temperature avoids differential thermal expansion of adjacent tubes.

A coal related factor which can influence design is the ash fusion temperature. Ash fusion temperature sets the maximum flue gas inlet temperature of the convection section (should be below ash fusion temperature) and therefore the split between radiant and convection heat transfer, i.e., the percentage of heat absorbed by each section. Fuels with the highest ash fusion temperature will permit a higher flue gas inlet temperature and a higher percentage of heat to be absorbed in the convection section. With lower rank coals, ash fusion temperature decreases resulting in increased area requirements for the air coil (lower approach temperature) and a higher percentage of steam generation via radiant heat transfer. Conversely, a high rank coal (such as an eastern bituminous coal) permits a lower radiant heat transfer, viz., a higher percentage of heat to be transferred to the air coil as well as reducing the convection section investment cost. In general, ash fusion temperature is higher for bituminous coals and lower for lignitic coals. Under conditions of using a coal having a high ash fusion temperature such as bituminous coal, and heat-resistant alloys for the metal parts of the convection section, the compressed air may be raised to temperatures as high as about 1900° F. with higher temperatures for the flue gas. For coals of high ash corrosion potential, tube coatings such as 50 Cr/50 Ni will be suitable.

The radiant section is provided with tubes located suitably above the burner combustion zone, called platens, which can be used for steam superheating or for steam superheating plus steam reheating. The steam generating tubes with the platens are designed with sufficient surface to control the temperature of the flue gas as it passes into the convection section so as not to exceed the ash fusion temperature of the coal used. However, the water walls are designed to absorb a smaller percentage of the heat and the platens a greater percentage compared to a conventional utility boiler. That is, the platens are given additional heating services compared to a conventional utility boiler. The platens are given some of the services the convection section formerly had. Thus, they function both to moderate the flue gas inlet temperature and free the convection section for the air heating duty assigned to it. That is, using up a substantial portion of the radiant section heat for superheat with or without reheat both lowers flue gas temperature to within a desirable range and takes over some traditional convection section services. Thus the platens can cooperate with the convection section in a way that is advantageous and unique to this invention.

Table I which is illustrative but not limitative of the invention presents a comparison between the heat distribution in a steam boiler of a conventional steam/power cycle utility plant, column A, and the distribution that can be used according to this invention for a combined steam turbine—air turbine power cycle burning the same sub-bituminous coal, column C. The radiant/convection heat split is 50/50. Columns B and D show the effects of using the combined cycle of this invention with other coal types. The boilers produce 2400 psi, 1005° F. steam. The platens are devoted to superheater service only, in this illustration. The term "percentage duty" or "% duties" means BTU's absorbed by the unit specified as a percentage of total heat absorbed in the boiler. Since furnace efficiency is generally about 90% with about 10% of the heat of combustion being released to the atmosphere, "total heat absorbed" excludes that amount of heat in the flue gas exiting from the stack.

In general, for a given coal type, and as shown in column A taken with column C, in the present invention there is a smaller percentage of heat absorbed by the water walls (31% as against 35%) and a higher percentage absorbed by the platens (19% as against 15%). The platens' surface area is maximized to be above normal, i.e., for the conventional utility case. Convection superheat duty is greatly reduced (to 7% as against 15%) which makes it apparent that the platens have taken over a portion of that task. This is instrumental in allowing 26% of available heat to be used for the compressed air coil as against 0% in the utility case. In case C the water walls absorb a smaller percentage of the total heat absorbed by the boiler so that, if compared to utility case A on the same coal firing rate basis, case C makes less steam, which is at the same condition of temperature and pressure.

Alternatively, the heat distribution may be as shown in Table II. It has the same radiant/convection ratio for the respective columns and the same compressed air coil duty percentages. However, the platens have both superheater, S/H, and reheater, R/H, services. The total platen duty is unchanged and the total #3 plus #4 service duties are unchanged.

Tables I and II also show the boiler heat splits for its various services as a function of three coal types. Table I shows that:

a. As coal type changes from an eastern U.S. type bituminous to lignite, the ash fusion temperature decreases. Hence, the need to increase the radiant heat percentage from 40 to 50 to 60 percent with this coal change.

b. For the present invention boiler vs. the reference utility boiler case, the radiant duty percentage in steam service increases vs. convection duty percentage in steam service. This is expressed by the term $(1+2)/(3+4+5)$. As the coal type changes from eastern bituminous to lignite, this ratio increases. Moreover, for any coal type, this ratio is larger than the utility boiler case ratio.

c. As the coal type changes from eastern bituminous to lignite, the radiant water wall duty to radiant platen duty decreases. Conversely, the platen duty percentage is increasing compared to the reference utility boiler case. (No. 1÷No. 2)

d. As the coal type changes from eastern bituminous to lignite, the heat duty percentage of the compressed air coil decreases.

e. Other noteworthy trends as coal changes from eastern bituminous to lignite are:
1. Progressive increase of superheat duty percentage, #2 platen + #3 superheater (conv.)
2. Progressive increase of reheater duty.
3. Progressive increase of #1 water wall plus #5 economizer duty.

Thus, according to this invention, a range of about 12 to 23% heat absorbed by the platens of total heat absorbed by the boiler with a range of about 20 to 33% heat absorbed by the compressed air coil, for producing 1005° F., 2400 psi steam, may be used. However, for lower pressure steam, for example 1005° F., 1860 psi steam, the lower level of heat absorption by the platens may be decreased to about 7%, so that a range of about 7 to 23% heat absorbed by the platens with about 20 to 33% heat absorbed by the compressed air coil will prove useful. Frequently, the percentage heat absorbed by the platens will be in the range of about 12 to 19% with the percentage heat absorbed by the compressed air coil in the range of about 26 to 33%.

TABLE I

| % Duties | A<br>Sub-Bit C<br>Ash Fusion<br>Temp °F.*<br>2250 | B<br>Utility<br>2400 psi, 1005° F. ———><br>Eastern<br>Bit<br>2400 | C<br>Sub-Bit C<br>2250 | D<br>Lignite<br>2100 |
|---|---|---|---|---|
| Radiant/Convection Split | 50/50 | 40/60 | 50/50 | 60/40 |
| (1) Water Walls | 35 | 28 | 31 | 37 |
| (2) Platens (superheater) | 15 | 12 | 19 | 23 |
| (3) Superheater (conv) | 15 | 11 | 7 | 5 |
| (4) Reheater (conv) | 13 | 10 | 11 | 12 |
| (5) Economizer | 7 | 6 | 6 | 3 |
| Compressed Air Coil | 0 | 33 | 26 | 20 |
| Ljungstrom Air Heater | 15 | 0 | 0 | 0 |
| WW ÷ Platens | 2.33 | 2.33 | 1.63 | 1.61 |
| $\frac{1+2}{3+4+5}$ | 1.43 | 1.48 | 2.08 | 3.0 |

*Initial Deformation Temperature
See ASTM, D 271-48

TABLE II

| % Duties | A<br>Sub-Bit C | B<br>2400 psi, 1005° F. ———><br>Eastern<br>Bit | C<br>Sub-Bit C | D<br>Lignite |
|---|---|---|---|---|
| Radiant/Convection Split | 50/50 | 40/60 | 50/50 | 60/40 |
| (1) Water walls | 35 | 28 | 31 | 37 |
| (2) Platens | 15 (9S/H) (6R/H) | 12 (7S/H) (5R/H) | 19 (12S/H) (7R/H) | 23 (16S/H) (7R/H) |
| (3) Superheater (conv) | 21 | 16 | 14 | 12 |
| (4) Reheater (conv) | 7 | 5 | 4 | 5 |
| (5) Economizer | 7 | 6 | 6 | 3 |
| Compressed Air Coil | 0 | 33 | 26 | 20 |
| Ljungstrom Air Heater | 15 | 0 | 0 | 0 |
| WW ÷ Platens | 2.33 | 2.33 | 1.63 | 1.61 |
| $\frac{1+2}{3+4+5}$ | 1.43 | 1.48 | 2.08 | 3.0 |

As contrasted with the necessity of controlling maximum flue gas inlet temperature to the convection section, the exit temperature of the flue gas from this section is flexible, no constraints being placed thereon. For maximum furnace efficiency the exit temperature should be as low as possible, viz., in the range of about 275° to about 400° F., preferably about 300° F. Low level heat is suitably used to heat boiler feed water (BFW).

Major equipment differences over the conventional coal-fired steam/power cycle include: replacement of the forced draft fans and regenerative air preheater with the air turbine, elimination of extraction steam/BFW heaters, and the boiler construction. Furthermore, at comparable firing rates, the present arrangement reduces gross steam system size and associated facilities (steam turbine, cooling water system and boiler feed water system) by as much as 25% since less steam is being generated. Elimination of the regenerative air preheater system and reduction in size of certain steam system components are major cost reductions that offset the cost of the boiler convection section which is considerably larger than usual.

The present arrangement integrates an indirect fired air turbine with a pulverized coal-fired steam/power cycle. It utilizes high level, e.g., 1700° F., heat (as contrasted with 1000° F. heat of a typical steam boiler) for efficient air turbine power generation while using inexpensive coal for firing. Highest temperatures and highest pressures give maximum efficiency of a turbine. As aforesaid, at comparable firing rates, it reduces steam production. That is, a portion of the heat of combustion is used for a steam power plant with another portion going to an air power plant generating power but no steam. Such a cycle is of special interest to the chemicals industry because of chemicals' high shaft work requirement relative to steam for heating, e.g., for compression work in compressing gases or in refrigeration. Thus the present arrangement provides efficient and inexpensive shaft work by linking an air turbine indirectly to coal firing.

The invention will now be described with reference to the drawings, see in particular FIGS. 1 and 2. For purposes of illustration but without limiting the invention, it will be described in connection with the use of a sub-bituminous coal with a lower heating value of 7500 BTU/lb. [8200 BTU/lb. (HHV)] and an ash fusion temperature of 2250° F. Combustion air requirements are 7.4 lbs. of air per lb. of coal. The maximum flue gas inlet temperature to the convection section is approximately 2000° F. as limited by the ash fusion temperature of this coal. Temperatures are shown illustratively and within the convection section denote flue gas temperatures, outside of it denote stream temperatures. The steam generation section absorbs about 31.4% of the heat, the platens' secondary steam superheater about 13.1%, the platens' steam reheater about 5.3% (making a total of 18.4% for the platens and 49.8% for the radiant section as a whole) and the convection section about 50.2%, based on total heat absorbed within the boiler. Thus the platens absorb approximately 36.9% of the heat absorbed by the radiant section. The breakdown in the convection section is 5.0% for steam reheating, 7.1% for steam superheating, 13.5% for the economizer and 24.6% for compressed air heating.

Figure 1:
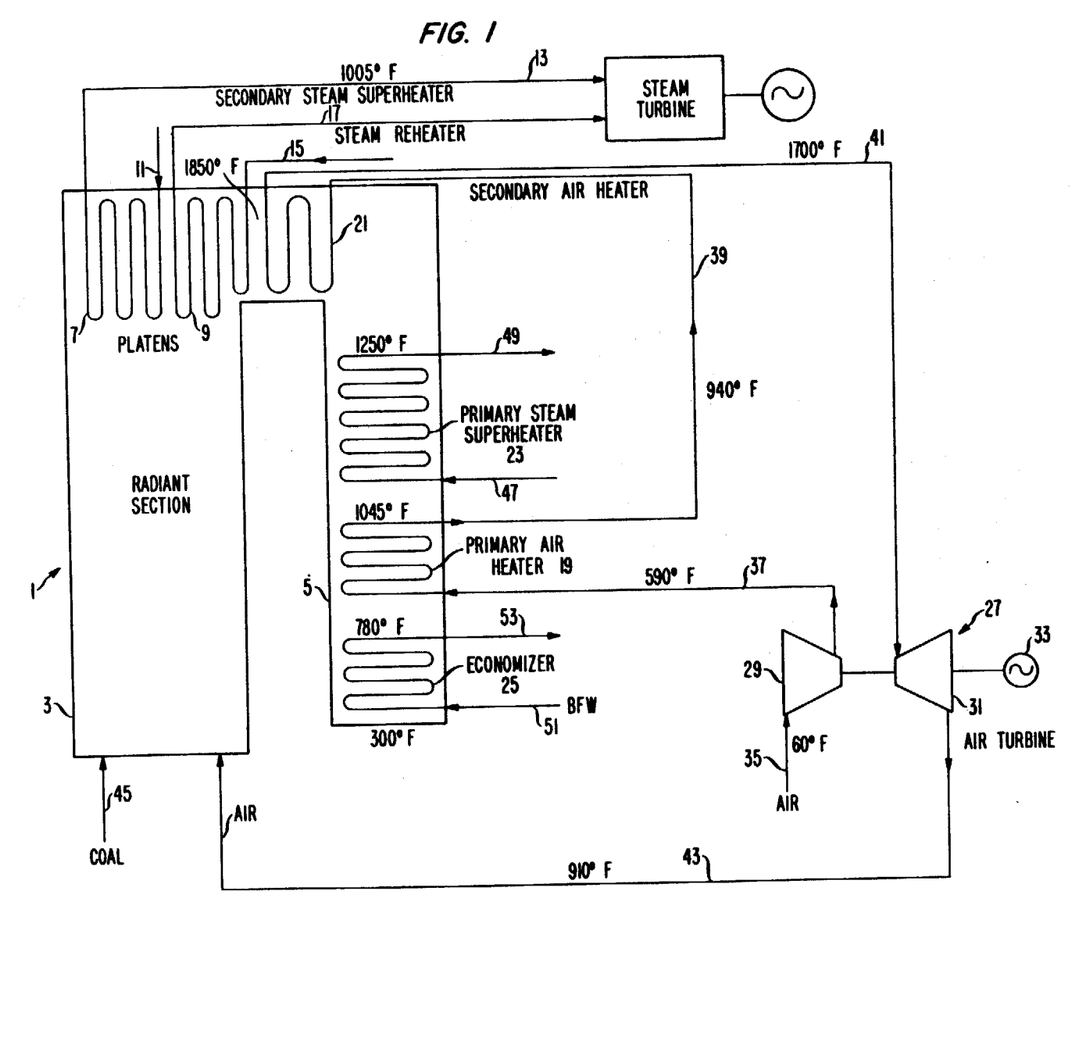
FIGS. 1 and 2 are schematic representations of two embodiments of a combined power cycle integrating a coal-fired boiler with an air turbine and a steam turbine.

Referring to FIG. 1, a steam boiler 1 comprises a radiant section 3 and a convection section 5. Platens are suspended from the roof of the radiant section 3. Platens 7 for superheating steam have an inlet line 11 and an outlet line 13 and platens 9 for reheating steam (a portion of the latter coil, adjacent the convection section, receives convective heat) have an inlet line 15 and an outlet line 17. In the convection section 5, primary air heater coil 19 and secondary air heater coil 21 heat compressed air in two stages and primary steam superheater coil 23 placed between them superheats steam. Judicious placement of the primary superheater can result in avoiding tube metal temperatures that make the tubes prone to ash corrosion. Ash corrosion of tubes is maximum at about 1300°±50° F. By arranging the convection section tubes so that tube metal temperatures are above or below this temperature range, ash corrosion of tubes can be avoided. Boiler feed water is heated in the economizer 25 located in the low temperature zone of this section. An air turbine set 27 is coupled to the convection section and comprises an air compressor 29, an air turbine 31 and a generator 33 (or other power consumer) all arranged on a common shaft.

In operation, pulverized coal is burned in the radiant section 3, the heat thereof generating steam in the tubes lining the walls. The flue gas, at about 2000° F., passes into the convection section 5. The compressor 29 takes air at about 60° F. from the ambient atmosphere by line 35, discharges compressed air at about 590° F. by means of conduit 37 into the primary air heater 19; the air at about 940° F. leaves 19 by conduit 39 to enter the secondary air heater 21 and leaves 21 to enter the air turbine 31 through conduit 41 at about 1700° F. After expansion in the turbine, the exhaust gas at about 910° F. is discharged through conduit 43 to the fuel burners of the radiant section 3 as preheated combustion air for combustion of the coal introduced by line 45. A portion of the hot turbine exhaust may be used to dry the coal. Steam taken from the water walls of the radiant section goes to a steam drum. Steam from the drum is introduced by line 47 into the primary steam superheater 23 and leaves by line 49 to enter the platens 7 comprising the secondary steam superheating section by line 11. Superheated steam at about 1005° F. and 2400 psig leaves by line 13 and is passed to the inlet of a steam turbine to generate power or power and extraction steam, although if there is a need for 1000° F. steam in industrial processes it may be used directly in such processes. Cool steam which has already passed through a cycle of expansion/cooling in the steam turbine is introduced by line 15 into the coil 9 comprising the steam reheating section and exits by line 17 for passage again to the steam turbine. Economizer 25 receives boiler feed water via line 51 which leaves by line 53 whence it is passed to the steam drum then passed to the water wall tubes of the radiant section 3 for steam generation.

It can be seen that the convection section furnishes medium level and high level heat to the compressed air from the compressor and discharges it at high temperature, in this illustration at about 1700° F., to the inlet of the air turbine. The air is expanded in the air turbine to drive the air compressor, to generate power, and to exhaust into the coal-fired boiler.

The convection section also furnishes medium level heat to the primary steam superheater but it can be seen that the platens perform the function of secondary steam superheating to raise this steam to a temperature of approximately 1000° F. and also perform some steam reheating, which functions were formerly to a larger extent the province of the convection section, thereby freeing the latter for its compressed air heat service. Thus the platens absorb a high percentage of the total heat absorbed in the boiler, hence also a large share of the heat absorbed by the radiant section as a whole. With lower rank coals (lower ash fusion temperature) higher values of heat absorbed by the platens will generally be approached. Other things being equal, the platens will absorb more heat at higher pressures of the steam within them.

The convection section furnishes low level heat to the BFW heater and flue gas exits at about 300° F.

Figure 2:
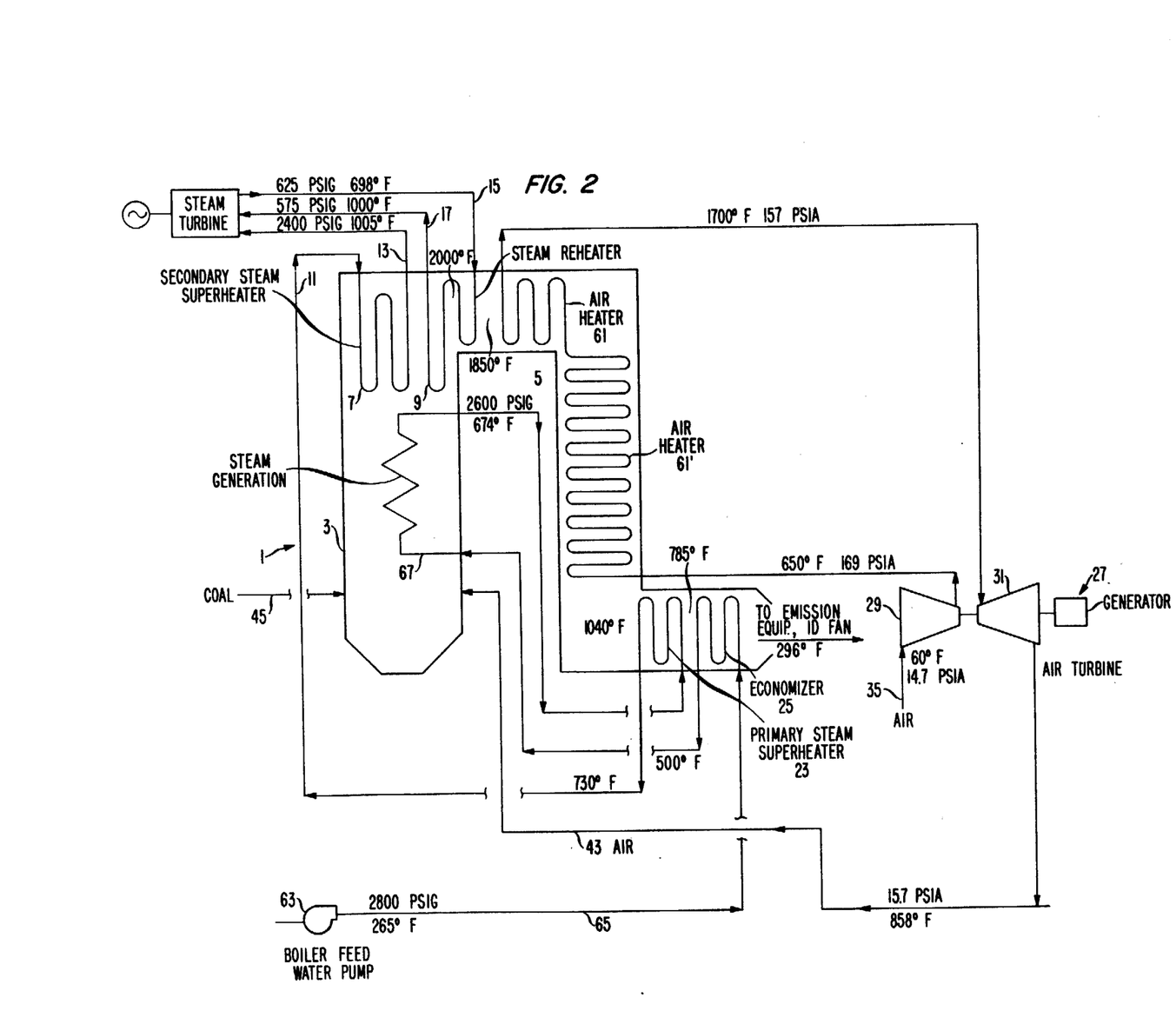

FIG. 2 illustrates another embodiment of the invention suitable for a combined power cycle comprising approximately a 50 MW (megawatt) air power plant and a 225 MW steam power plant for utility application. Temperatures/pressures shown are exemplary and are not limitative of the invention. A difference over FIG. 1 is that the air heater is unitary and is situated above the 1040° F. up to the 1850° F. flue gas while the primary steam superheater coil is situated between the 785° F. and 1040° F. flue gas.

Air is compressed in the air compressor 29 to a pressure of 169 psia and 650° F. and flows into the air heater coil 61', 61. The hot compressed air at about 1700° F. and 157 psia flows to the air turbine 31 and expands through the turbine. Exhaust gas at 858° F. and 15.7 psia flows to the coal pulverizer and to the burners in the combustion zone of radiant section 3 of the boiler, as combustion air. Boiler feed water, which is a condensate removed from the steam turbine, is pumped by pump 63 up to 2800 psig and at this pressure and a temperature of 265° F. flows through line 65 to the economizer 25 located in the low temperature zone of the convection section where it is heated to 500° F., thence to the steam drum thence to the water wall tubes indicated by 67 in the radiant section. Steam is thus generated and at 2600 psig and 674° F. flows to the primary steam superheater 23 in the convection section. At a higher temperature of 730° F. this steam passes into the platens 7 comprising the secondary steam superheating section, then at 2400 psig and 1005° F. to the inlet of the steam turbine. Cool steam at 625 psig and 698° F. from the steam turbine is recycled by line 15 to the steam reheating section 9 which partly receives radiant heat in platens in the 2000° F. flue gas zone and partly receives convective heat in tubes in the 2000° F.–1850° F. flue gas region, exiting by line 17 to the steam turbine at 575 psig and 1000° F. Flue gas exits the convection section at about 296° F. and is passed to emission control equipment and an induced draft fan.

Figure 3:
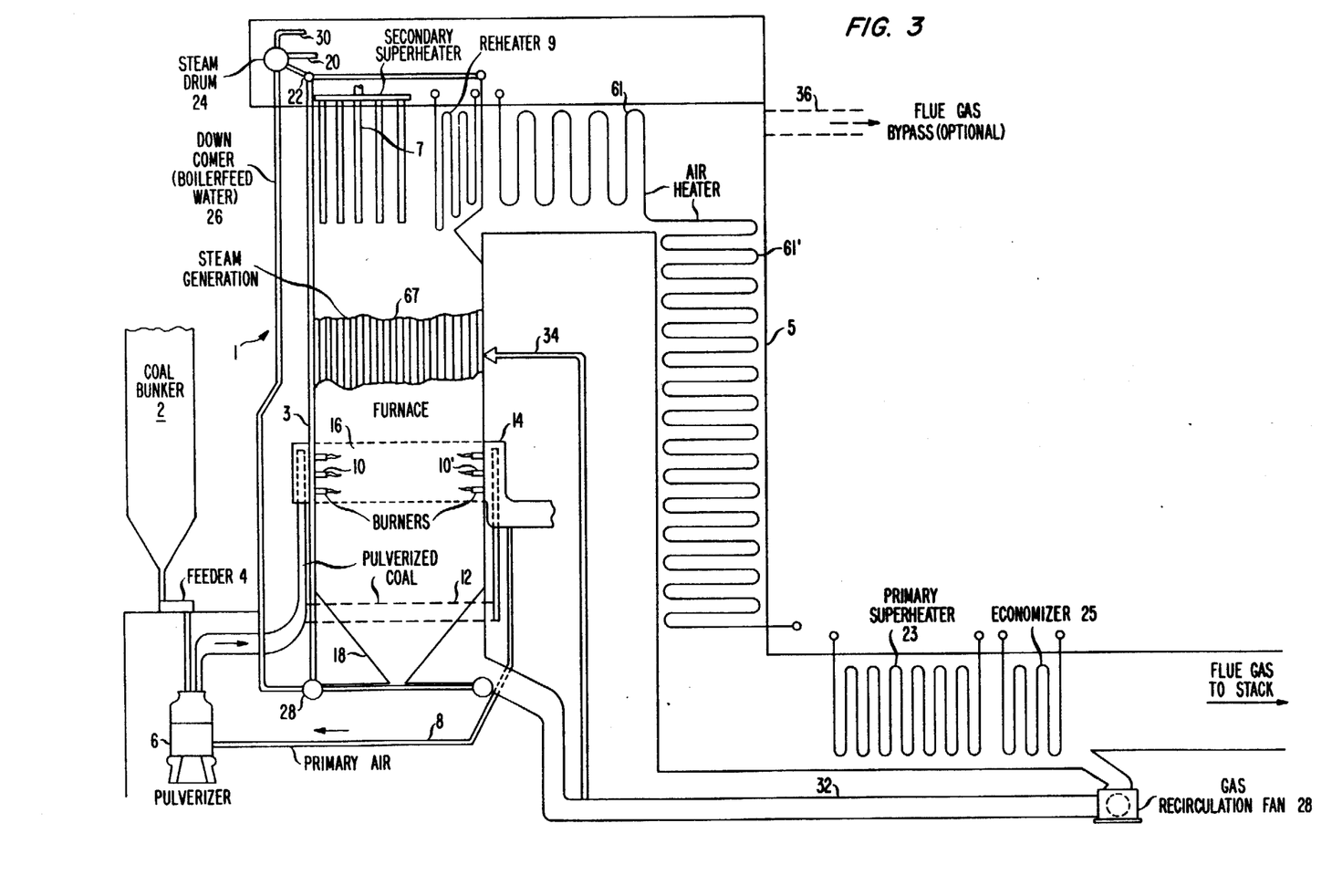
FIG. 3 is a diagrammatic elevational view of a steam boiler partly in section showing the structure of the radiant and convection sections.

FIG. 3 shows more detailed structure of a steam boiler according to the invention having a radiant section 3 usually of boxlike shape, and a convection section 5 suitably L-shaped to accommodate its large size. Since the horizontal portion can rest on the ground, support problems are minimal.

As shown in FIG. 3, coal bunker 2 for holding a supply of coal is connected to feeder 4 which feeds coal into a pulverizer 6. In order to dry the coal, hot turbine exhaust gas, still above atmospheric pressure, is passed into the pulverizer via line 8. It lifts finely divided coal and sends it as a spray to the burners indicated at 10 and 10' which are connected by conduit 12. Conduit 14 supplies the major portion of hot turbine exhaust gas, usually about 75% of the total amount used in the boiler with about 25% going to the pulverizer via line 8. This air is directed around the combustion zone 16 to the burners to provide oxygen for combustion of the coal at the burners. Steam generation takes place in the vertical tubes 67 (which may be bent to accommodate furnace equipment). These tubes, located at the walls of the radiant section, hence called water walls, suitably are joined by metal strips to form a continuous surface except where openings are needed for instruments and burners, to permit recirculation of flue gas, or the like. This assembly is integral with the outer walls of the radiant section 3, the entire structure being termed a membrane wall construction. The tubes may be bent at the bottom 18 in coutant shape to facilitate ash removal.

Water from the economizer 25, via line 20, and steam from the water walls 67, collected in manifold 22, are mixed in steam drum 24 where the mixture separates; water flows by natural circulation via downcomer 26 to manifold 28 which feeds the water walls and steam is passed via line 30 to the primary superheater 23.

Secondary superheater platens 7 and reheater platens 9 which may be tubes connected by manifolds or may be serpentine, depend from the roof of the radiant section; air heater 61,61', primary superheater 23 and economizer 25 are provided in the convection section, functioning as described above.

Preferably the air heater tubes 61 in the highest temperature zone of the convection section are vertical and relatively widely spaced apart to avoid bridging between tubes by ash. The remaining air heater tubes 61' as well as tubes of the primary superheater and economizer may be vertical or horizontal and more closely packed together, as shown. The internal diameter of the air heater tubes is suitably in the range of about 3 to about 8 inches, preferably in the range of about 4 to about 6 inches.

For additional flexibility in temperature control, a flue gas recirculation fan 28 may withdraw low temperature flue gas passing to the stack and send it by lines 32 and 34 into the radiant section 3, lowering the temperature in this section. An optional flue gas bypass 36 around the convection section back to the radiant section shifts heat to the radiant section when that is desirable.

Figure 4:
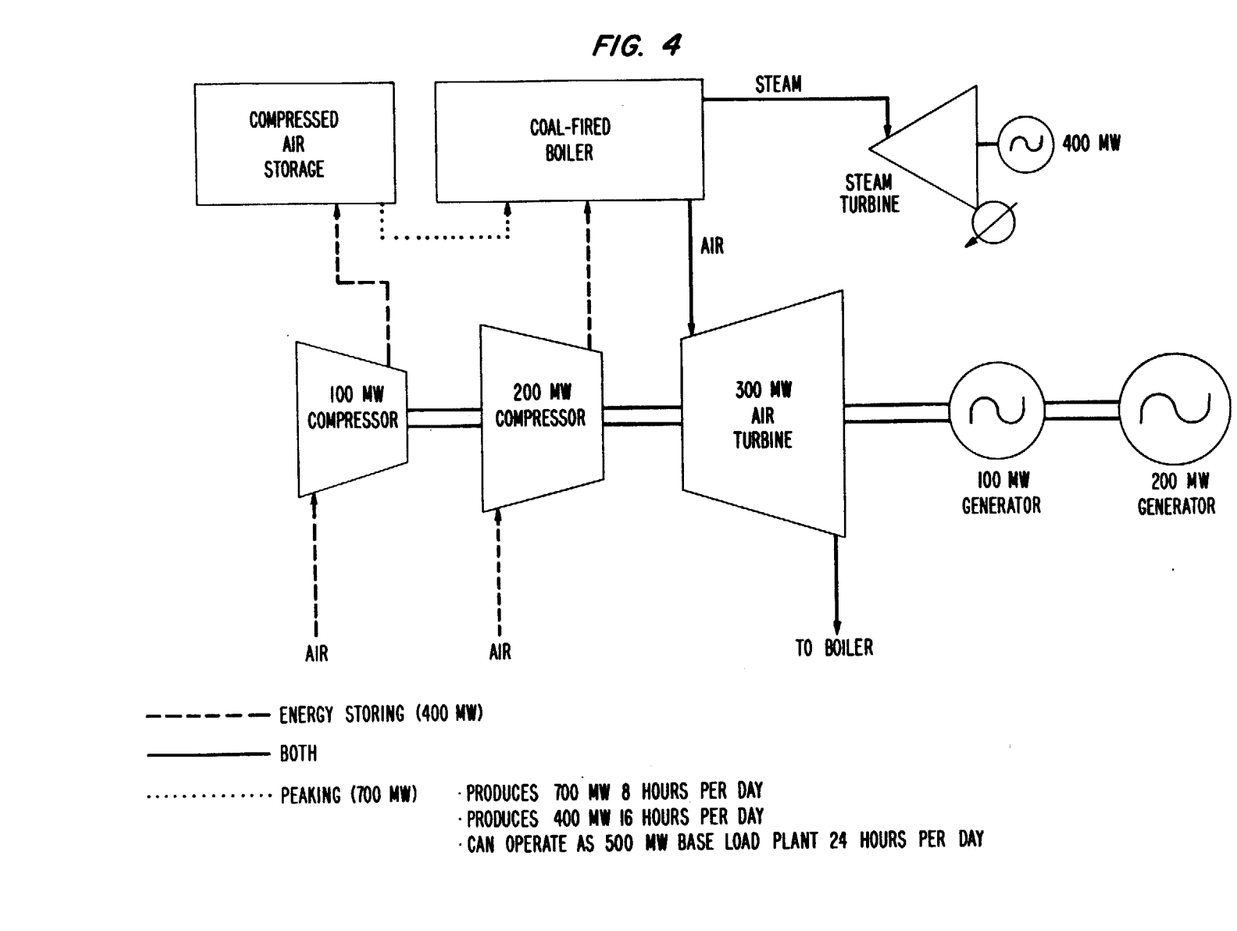
FIG. 4 is a schematic representation of one embodiment of a compressed air energy storage system.

FIG. 4 illustrates, without limiting the invention, a plant utilizing a compressed air energy storage unit, i.e., one which stores compressed air until it is needed. The air can be accumulated at periods of low power usage and used at periods of high power usage. In this illustration the plant can produce 700 MW 8 hours per day and 400 MW 16 hours per day or, alternatively, could produce 500 MW 24 hours per day. Most of the plant operates in the manner previously described at all times, the difference being that when power usage is low the shaft work of the air turbine is shifted to compressing air and when power usage is high it is shifted to generating electricity. As there is no change in the design or operation of the boiler, air turbine expander and steam turbine, the addition of compressed air energy storage to the plant is completely compatible therewith. Parts required are an additional compressor, generator and an underground air storage facility.

Only air is used in the turbine. Compressed air is heated by the coal-fired boiler (described above) whether from storage or directly from the compressor. Known compressed air energy storage units fire air and oil or gas fuel in a combustor; combustion products, not just air, expand through a gas turbine.

Table III presents a comparison of Base Case, a conventional utility pulverized coal steam/power cycle, with the present invention, both using a condensing steam turbine. The air at the inlet to the air turbine is at a temperature of 1700° F. In both cases the boiler produces 2400 psig/1005° F. superheated steam; the recycle steam is reheated to 1000° F. The comparison is made for the same type coal in each case.

TABLE III

|  | Base Case Conventional Utility Cycle - Condensing | Present Invention Condensing Air Turbine - 1700° F. |
|---|---|---|
| Gross Steam Production (M lbs/hr) | 1.875 | 1.285 |
| Coal Consumption (M lbs/hr) | .309 | .286 |
| Power Generation (MW) | | |
| Steam Turbine | 274.8 | 223.5 |
| Air Turbine | — | 51.3 |
| Power Plant Requirements | −12.0 | −12.0 |
| Net Total | 262.8 | 262.8 |
| Net Cycle Efficiency (% HHV) | 35.5 | 38.2 |
| Net Fuel Chargeable to Power (BTU/kw-hr-Higher Heating Value) | 9614 | 8934 |

Table III shows that the present invention has a cycle efficiency of 38.2% as against 35.5% for Base Case, an increase of 2.7%. It consumes 7.4% less fuel.

In this illustration the air turbine supplies 19.5% of the total net power generated. Coal consumption is lower for the same net power output, thereby giving an improved cycle efficiency, as aforesaid. This can also be expressed in a different manner as showing that with the present system, at equal coal consumption more net power can be produced with lower gross steam production, compared with the conventional utility steam/power cycle.

Table IV presents a comparison of another Base Case, a conventional industrial pulverized coal steam/power cycle with the present invention, both using a back pressure steam turbine. The air at the inlet to the air turbine is at a temperature of 1700° F. In both cases the boiler produces 1860 psig/1005° F. superheated steam. As can be seen, the present invention produces 77% more net power for a 8.7% increase in fuel consumption, at comparable cycle efficiency.

TABLE IV

|  | BASE CASE Back Pressure Cycle | Present Invention Back Pressure Air Turbine - 1700° F. |
|---|---|---|
| Gross Steam Production (M lb/hr) | 2.175 | 1.926 |
| Export Steam (M lb/hr) (625 psig, 700° F.) | 1.603 | 1.603 |
| Coal Consumption, (M lb/hr) | 0.3646 | 0.3964 |
| Net Power Generation (MW) | | |
| Back pressure | 77.09 | 64.35 |

TABLE IV-continued

|  | BASE CASE Back Pressure Cycle | Present Invention Back Pressure Air Turbine - 1700° F. |
|---|---|---|
| Air turbine | — | 72.08 |
| Total | 77.09 | 136.43 |
| Net Cycle Efficiency (%, HHV) | 81.1 | 81.0 |
| Net Fuel Chargeable to Power (BTU/kw-hr-HHV) | 4211 | 4215 |

Table V shows a comparison of a condensing steam turbine/air turbine combined power cycle when the air at the inlet of the air turbine is at a temperature of 1500° F. is against 1700° F. The figures for the latter are reproduced from Table III.

TABLE V

| | Present Invention Condensing Steam Turbine → | |
|---|---|---|
| | Air Turbine 1700° F. | Air Turbine 1500° F. |
| Total Net Power (MW) | 262.8 | 255 |
| Coal Consumption (M lbs/hr) | .286 | .286 |
| Net Fuel Chargeable to Power (BTU/kw-hr-HHV) | 8934 | 9204 |
| Net Cycle Effieicieny (%, HHV) | 38.2 | 37.1 |

Thus, cycle efficiency increases with increase in temperature of the air at the inlet to the air turbine. However, even at the relatively lower temperature of 1500° F. cycle efficiency, 37.1%, is better than for the conventional utility cycle, 35.5%, shown in Table III.

It is therefore apparent that the present invention can increase the cycle efficiency of a condensing power cycle or can increase the power production of a back pressure cycle at comparable efficiency. It also has the potential for utility plant renovation and conversion to coal since it can increase net power generation of a conventional coal-fired utility plant condensing cycle by 30% at the same gross boiler steam rate. It has application both for industrial purposes or for utilities.

Although the invention has been described with reference to coal as the fuel, other non-premium quality fuels may be used such as tars, peat, wood, refuse or low BTU gas, etc., and boiler combustion may either by pulverized fuel operation, or may be an alternative firing method such as stoker combustion. As another alternative, a closed cycle air turbine system may be employed in which a heat exchanger is used to transfer heat from the air turbine exhaust gas to ambient air which is then used as preheated combustion air in the boiler. In such a closed cycle a helium turbine may be used in place of an air turbine. Such modifications may be made without sacrificing the invention's chief advantages.

What is claimed is:

1. A power plant comprising the combination of: a steam turbine, a coal-fired steam boiler having a radiant section including a combustion zone and steam generating tubes and a convection section provided with tubes for heating compressed air by indirect heat exchange with flue gas; compressor means wherein air is compressed for passage to said convection section; air turbine means driven by expansion of air compressed by said compressor means then heated in said convection section and passed to the inlet of said turbine means; said turbine means being arranged to produce useful power; conduit means for passing air turbine exhaust to said combustion zone as preheated combustion air; and conduit means for removing steam from said boiler and passing the same to the inlet of the steam turbine; said radiant section containing means for steam superheating or for steam superheating plus steam reheating and absorbing a sufficient percentage of heat for said services to release the convection section for compressed air heating service whereby the temperature of said compressed air is raised to at least about 1450° F.

2. A power plant comprising the combination of: a steam turbine, a coal-fired steam boiler having a radiant section including a combustion zone and steam generating tubes and a convection section provided with tubes for heating compressed air by indirect heat exchange with flue gas; compressor means wherein air is compressed for passage to said convection section; air turbine means driven by expansion of air compressed by said compressor means then heated in said convection section and passed to the inlet of said turbine means; said turbine means being arranged to produce useful power; conduit means for passing air turbine exhaust to said combustion zone as preheated combustion air; and conduit means for removing steam from said boiler and passing the same to the inlet of the steam turbine; said radiant section containing platens, said platens comprising a steam superheating section or a steam superheating section plus a steam reheating section effective to permit partial substitution of such service in the convection section by compressed air heating service whereby the temperature of said compressed air is raised to at least about 1450° F.

3. A power plant as set forth in claim 1 in which said air temperature is raised to about 1450° to 1700° F.

4. A power plant as set forth in claim 2 in which the convection section compressed air heat duty is in the range of about 20 to 33% of the total heat absorbed in the boiler.

5. A power plant as set forth in claim 2 in which the percentage heat absorbed by the platens is in the range of about 7 to 23% and the percentage heat absorbed by the tubes for heating compressed air is in the range of about 20 to 33% of the total heat absorbed in the boiler.

6. A power plant as set forth in claim 2 in which the percentage heat absorbed by the platens is in the range of about 12 to 23% and the percentage heat absorbed by the tubes for heating compressed air is in the range of about 20 to 33% of the total heat absorbed in the boiler.

7. A power plant as set forth in claim 2 in which the percentage heat absorbed by the platens is in the range of about 12 to 19% and the percentage heat absorbed by the tubes for heating compressed air is in the range of about 26 to 33% of the total heat absorbed in the boiler.

8. A power plant as set forth in claim 2 in which a portion of the air turbine exhaust is used to dry coal in pulverized form before said coal is passed into said combustion zone.

9. A power plant as set forth in claim 2 in which the convection section is provided with tubes comprising:
an air heater for heating compressed air;
a primary steam superheater for heating steam generated in said radiant section; and
an economizer for heating boiler feed water located in a low temperature zone of the convection section.

10. A power plant as set forth in claim 9 in which the convection section is L-shaped.

11. A power plant as set forth in claim 9 in which air heater tubes in the highest temperature zone of the convection section are vertical and relatively widely spaced apart and the remaining tubes in the convection section are vertical or horizontal and more closely packed together.

12. A power plant as set forth in claim 9 in which said convection section tubes are arranged so that tube metal temperatures are above or below 1300°±50° F.

13. A power plant as set forth in claim 9 in which the flue gas exits from the convection section at a temperature in the range of about 275° to 400° F.

14. A power plant as set forth in claim 2 in which the convection section is provided with tubes comprising:
   a primary air heater for heating compressed air from said compressor means;
   a secondary air heater for further heating said compressed air;
   a primary steam superheater for heating steam generated in said radiant section; and
   an economizer for heating boiler feed water.

15. A power plant as set forth in claim 14 in which the convection section heats the units in zones of decreasing flue gas temperature in this order: secondary air heater, primary steam superheater, primary air heater and economizer, the flue gas exiting from the convection section at a temperature in the range of about 275° to 400° F.

16. A power plant as set forth in claim 14 in which the flue gas exits at a temperature of about 300° F.

17. A power plant as set forth in claim 2 in which the tubes for heating compressed air are comprised in a single unit.

18. A power plant as set forth in claim 2 in which compressed air energy storage means is provided for receiving compressed air from compressor means during periods of low power usage and for passing stored compressed air to the convection section of the boiler for heating therein thence to the inlet of said air turbine means during periods of high power production.

19. A power plant as set forth in claim 2 in which the air turbine means contributes about 5 to 50% of the total net power generated by the plant.

20. A power plant as set forth in claim 2 in which the steam turbine is used to produce useful power or to produce useful power and steam for extraction.

21. A power plant as set forth in claim 2 in which the air turbine means is used to produce shaft work and/or to generate electricity.

22. A power plant comprising the combination of: a steam turbine, a steam boiler fired by a non-premium quality fuel and having a radiant section including a combustion zone and steam generating tubes and a convection section provided with tubes for heating compressed air by indirect heat exchange with flue gas; compressor means wherein air is compressed for passage to said convection section; air turbine means driven by expansion of air compressed by said compressor means then heated in said convection section and passed to the inlet of said turbine means, said compressor means being driven by said turbine means or by auxiliary means; said turbine means being arranged to produce useful power; conduit means for passing air turbine exhaust to said combustion zone as preheated combustion air; and conduit means for removing steam from said boiler and passing the same to the inlet of the steam turbine; said radiant section containing platens, said platens comprising a steam superheating section or a steam superheating section plus a steam reheating section and absorbing a sufficient percentage of heat for said services to release the convection section for compressed air heating service whereby the temperature of said compressed air is raised to at least about 1450° F.

23. A power plant comprising the combination of: a steam turbine, a coal-fired steam boiler having a radiant section including a combustion zone and steam generating tubes and a convection section provided with tubes for heating compressed air by indirect heat exchange with flue gas; compressor means wherein air is compressed for passage to said convection section; air turbine means driven by expansion of air compressed by said compressor means then heated in said convection section and passed to the inlet of said turbine means, said compressor means being driven by said turbine means or by auxiliary means; said turbine means being arranged to produce useful power; means for recovering heat from air turbine exhaust to preheat boiler combustion air and conduit means for removing steam from said boiler and passing the same to the inlet of the steam turbine; said radiant section containing means for steam superheating or for steam superheating plus steam reheating effective to absorb a sufficient percentage of heat for said services to release the convection section for compressed air heating service whereby the temperature of said compressed air is raised to at least about 1450° F.

24. In a method of operating a power plant comprising a coal-fired steam boiler/steam turbine power cycle, the improvement which comprises:
   integrating an air turbine with said cycle to provide a combined power cycle by heating compressed air by indirect heat exchange with flue gas in the convection section of said boiler, passing the hot compressed air to the inlet of the air turbine and expanding it in the air turbine;
   maintaining a radiant/convection heat split in the boiler which avoids coal ash fusion substantially;
   using a lower percentage of heat for generating steam of the same temperature and pressure;
   using remaining available heat in the radiant section for steam superheating or for steam superheating plus steam reheating thereby reducing such services in the convection section and allowing the convection section to carry out compressed air heating service so as to heat the compressed air to a temperature of at least about 1450° F.; and
   passing air turbine exhaust as preheated combustion air to the boiler.

25. In a method of operating a power plant comprising a coal-fired steam boiler/steam turbine power cycle, the improvement which comprises:
   integrating an air turbine with said cycle to provide a combined power cycle by heating compressed air by indirect heat exchange with flue gas in the convection section of said boiler, passing the hot compressed air to the inlet of the air turbine and expanding it in the air turbine;
   maintaining a radiant/convection heat split in the boiler which avoids coal ash fusion substantially;
   using a lower percentage of heat for generating steam of the same temperature and pressure;
   transferring radiant heat from the coal firing along with convective heat from the flue gas available after provision for air heat duty raising the air to at least about 1450° F., to tubes in the boiler to produce high pressure superheated steam; and passing air turbine exhaust as preheated combustion air to the boiler.

26. In a method of operating a power plant comprising a coal-fired steam boiler/steam turbine power cycle, the improvement which comprises:

integrating an air turbine with said cycle to provide a combined power cycle by heating compressed air by indirect heat exchange with flue gas in the convection section of said boiler, passing the hot compressed air to the inlet of the air turbine and expanding it in the air turbine;

maintaining a radiant/convection heat split in the boiler which avoids coal ash fusion substantially;

using a lower percentage of heat for generating steam of the same temperature and pressure;

providing platens in the radiant section of the boiler for steam superheating or for steam superheating plus steam reheating which assume a portion of such services of the convection section so as to enable the convection section to have a compressed air heat duty in the range of about 20 to 33% of the total heat absorbed in the boiler thereby heating the compressed air to a temperature of at least about 1450° F.;

using low level heat in the convection section to heat boiler feed water and removing flue gas from the convection section at a temperature in the range of about 275° F. to 400° F.; and passing air turbine exhaust as preheated combustion air to the boiler.

* * * * *